UNITED STATES PATENT OFFICE.

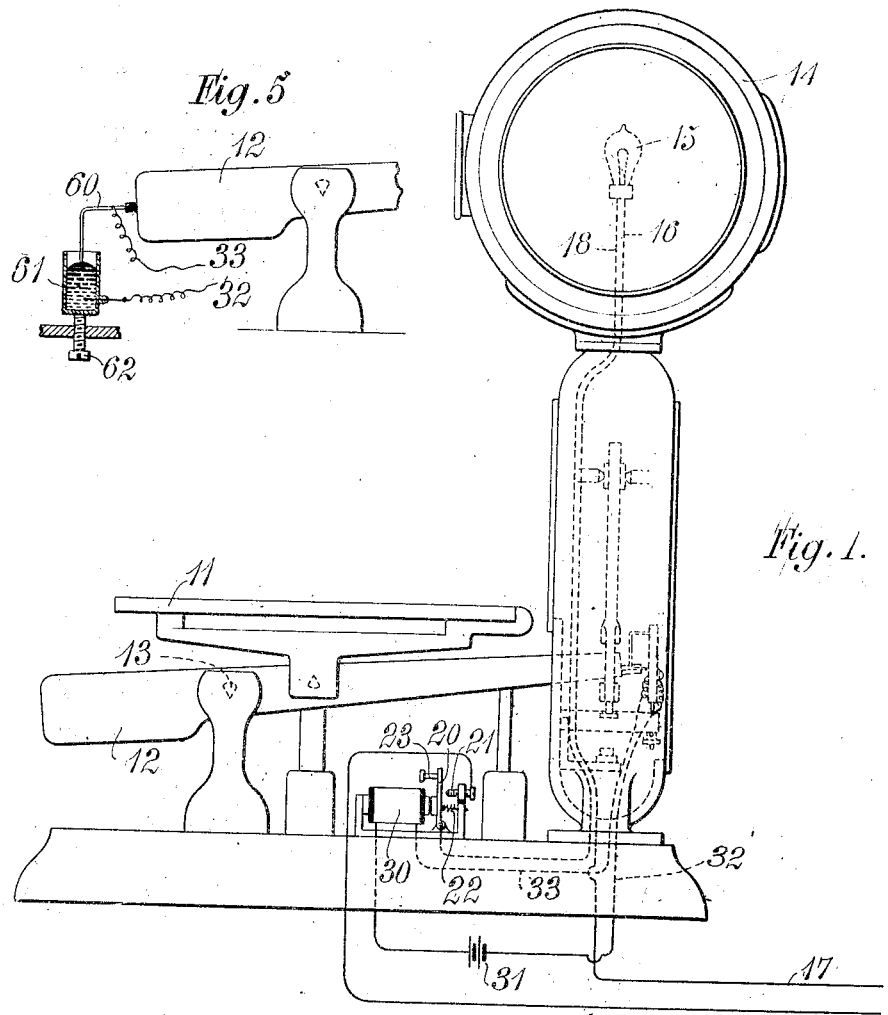

CHARLES B. LONGSTRETH, OF DAYTON, OHIO, ASSIGNOR, BY DIRECT AND MESNE ASSIGNMENTS, TO JONATHAN B. HAYWARD, OF NEW YORK, N. Y.

COMPUTING-SCALE-ILLUMINATING DEVICE.

1,105,806.   Specification of Letters Patent.   Patented Aug. 4, 1914.

Application filed January 4, 1909. Serial No. 470,311.

*To all whom it may concern:*

Be it known that I, CHARLES B. LONG-STRETH, a citizen of the United States, residing at Dayton, county of Montgomery, and State of Ohio, have invented certain new and useful Improvements in Computing-Scale-Illuminating Devices, of which the following is a full, clear, and exact description.
This invention relates to improvements in illuminating devices for computing or weighing scales and has among its objects to provide an illuminating lamp which shall light up the scale, particularly the reading portion thereof, when the scale is used for weighing operations.

It has heretofore been proposed to automatically illuminate such a scale by the movements of certain portions of the scale itself, such as the scale lever. The control of such illumination by movable parts of the scale must be such as in no way to interfere with the weighing accuracy of the scale. In my proposed improvements, I utilize an electric lamp for illumination purposes, and instead of controlling this lamp circuit directly by the movable parts of the scale, I control it by means of an auxiliary circuit. This auxiliary circuit can be very weak as compared with the strength of the main lamp circuit, which will be advantageous for securing the proper control by the scale lever. Furthermore, I have so arranged my auxiliary circuit, with relation to the lamp circuit, that there is absolutely no connection between the scale and the circuit controlling devices during the weighing movements of the scale lever. The sole connections of this sort are so located as to be engaged only when the scale lever is in normal zero position or is traveling beyond the range of its weighing positions. That is, in my present improvements, the scale lever when in normal zero position, closes an auxiliary circuit which operates through a magnet to open the switch in the main lamp circuit so as to prevent the lamp circuit from being lighted; when, however, the scale lever moves away from zero position, this instantly breaks the auxiliary circuit and allows the switch in the main lamp circuit to close, which thereupon lights and illuminates the scale.

With this general description of the object and purposes of my invention, I will now describe the details of construction with reference to the accompanying drawings.

Of said drawings Figure 1 represents a side view of my scale showing the electric contact devices and connections. Figs. 2, 3 and 4 represent detail views of the contact devices, and Fig. 5 represents a modified form of contact device.

These devices are shown applied to one particular form of computing scale now known on the market under the name of the "Toledo," which scale is described as to its general construction and operation in patent to De Vilbis, No. 839,736, dated December 25, 1906, to which patent reference may be had for such details of general construction as are not fully described herein. It will be understood, however, that the present improvements are applicable to various other forms of scales.

The scale is provided with the usual scale pan 11 which oscillates the scale lever 12 about the pivotal point 13'. This scale lever is connected by suitable means, not shown herein, to a revolving chart carried in the drum casing 14. An electric lamp 15, situated in the end of this casing, serves to illuminate the drum and assist in the reading of the computing figures. Leading from this lamp 15 is a connecting wire 16 which connects with the main wire 17 of the line circuit supplying the electric current to the lamp. The other wire 18 from the lamp 15 leads to a switch for this lamp circuit. This switch comprises the movable contact arm 20 and the stationary contact point 21. The arm 20 is normally spring-drawn by the spring 22 into contact closing position so as to close the main circuit and illuminate the lamp 15. There is also provided however an auxiliary circuit in which is included a magnet or solenoid 30 which acts upon the movable contact arm 20 and draws it against a stop pin 23 to hold the contact arm against its spring tension, and thus holds the lamp circuit open. One of the wires from this solenoid 30 leads to the small battery 31 and thence by the lead wire 32 to the contact device which will presently be described. The other wire 33 leading from the solenoid 30 leads to the other side of said contact device. This contact device is suitably mounted at the rear of the scale so as to permit the upward and downward oscillations of the scale lever 12. This contact device comprises two contact strips 40 and 41 mounted upon the back plate 42 and connected, respectively, with the lead wires 32 and 33 of the auxiliary circuit. These contact strips are of small flexible wire and have a slight spring-like action.

The end of the scale lever 12 has projecting from it an insulated conducting pin or contact closer 43 which is substantially diamond shaped in cross section so that the pin in sliding up between the contact strips 40 and 41 will touch said strips at single points on opposite sides of said diamond shaped pin whereby to close the contact between the lead wires 32 and 33 and thus close the auxiliary circuit heretofore referred to. By means of set screws 44 and 45, seated in said back plate 42, and connected by silk threads 46 or other suitable means to said contact strips, these contact strips may be drawn toward each other or allowed to separate from each other the required amount so as to adjust them into proper contact making position with the contact closing pin 43. There are such screws and threads both at the top and bottom of these contact strips so as to effect the contact between the pin 43 and said strips during the entire travel of the pin therebetween. These silk threads are of course wound around the ends of said screws so that by a slight turning of the screw the thread will be made tighter or looser as desired so as to vary the contact tension of the strips.

The entire plate 42 is mounted upon slide rods 50 so as to slide up and down in the bottom plate 51 and is then adjustable vertically by means of the set screw 52 which draws the plate 42 downward against the tension of the spring 53.

The operation of these devices is as follows: The scale is first adjusted so that it rests properly with the scale lever exactly in normal zero position. Then the set screw 52, for the contact device for the auxiliary circuit, is adjusted so that with the scale lever in this exact zero position, the back plate 42 is moved downward until the contact pin 43 just touches both of the contact strips 40 and 41. This results in closing the auxiliary circuit so that the solenoid or magnet 30 acts upon the contact arm 20 to hold the main lamp circuit open. When however any weight is placed upon the scale, the contact with the strips 40 and 41 is instantaneously broken by the downward movement of the scale lever; hence the auxiliary circuit now being open has no effect on the contact arm 20, therefore this arm is then spring drawn into contact with the screw 21, thus closing the main lamp circuit and illuminating the scale. It will thus be seen that there are no parts of this contact device which have any effect on the movable parts of the scale during even the slightest extent of the weighing movements of the scale. The contact in this auxiliary circuit takes place only when the scale lever comes back to normal zero position and also while the scale lever is oscillating above this zero position, that is, beyond the range of its weighing positions. These contact strips 40 and 41 and the contact closing pin 43, are so made that there is but very slight frictional contact between the parts and practically no material pressure to interfere with the free movement of the scale lever 12. Even if there were any interference to a slight extent, this would not be a material objection because of the fact that such interference is taking place beyond the range of weighing movements of the lever and would merely serve as a slight dampening effect on the oscillations without in any way interfering with the accuracy of the scale. Likewise it appears from this construction that the switch for closing the main lamp circuit may be located at any desired point attached to the framework of the scale or at some distance therefrom where there would be no likelihood of injurious effects upon the scale from the sparking produced by the making and breaking of the main circuit. The auxiliary circuit is a very weak one so that it has no deleterious effect on the scale parts by being made and broken and may be of such small strength that it will not exhaust the battery 31 for a long time, even though this auxiliary circuit remains closed while the scale is not in use.

The contact strips 40 and 41 are displaced or moved only a very slight extent by the contact pin 43 when contact is made as just described; and this slight displacement remains uniform and is not augmented as the scale lever moves up or down over the range of contact making position. That is, the displacement is not increased or varied upon the continued extent of movement of the lever. These contact devices are distinctive in that they effectuate an even pressure on the movable scale element irrespective of the location of the lever in its path of travel. There is a side thrust of the strips 40 and 41 upon the scale lever at right angles to its direction of movement, sufficiently to make the contact, and the two opposite side thrusts balance each other when adjusted, whereby not to force the scale lever to one side or the other out of its proper line of travel. These are added advantages in a device of this sort involving a movable scale element wherein accuracy demands that the scale element be interfered with as little as possible and not under uncertain or variable extents or influences.

In Fig. 5 is shown a modification of the contact closing device for the auxiliary circuit. In this modification, the lead wire 28 from the solenoid 30 would be connected to a pin 60 insulated from the scale lever and located at the left end of said lever; while the lead wire 32 will be connected to a mercury cup 61, also suitably insulated. Thus when the scale lever is in zero position the pin 60 would just at that point make contact with the mercury in the cup and thereby close the auxiliary circuit, and when the other end of the scale lever moves downward for the weighing positions the left end of the scale lever in rising would withdraw the pin 60 from contact with the mercury and thus break the auxiliary circuit and thus effect the closing of the switch in the main lamp circuit in the manner already described. The adjusting screw 62 would permit the mercury cup to be adjusted to close the contact at this point when the scale lever is at rest in its exact normal zero position.

It is to be understood that the mechanisms above described constitute a preferred form of embodiment of this invention and that other forms might be used without departing from the spirit of the invention and still coming within the scope of the claims which follow.

What is claimed is as follows:

1. The combination with a weighing scale, of an electric illuminating lamp therefor, and a circuit for said lamp; a switch for said lamp circuit; an auxiliary circuit including an element operating upon said lamp switch to hold it open when the auxiliary circuit is closed; a contact device in said auxiliary circuit; and means connected with the movable parts of said scale for controlling said contact device, said means and said contact device being constructed and located to hold said auxiliary circuit closed only when the scale parts are in normal zero position whereby at that time to hold the lamp switch open.

2. The combination with a weighing scale, including a scale lever, of an electric illuminating lamp therefor, and a circuit for said lamp; a switch for said lamp circuit normally closing said circuit; an auxiliary circuit including a solenoid operating upon said lamp switch to hold it open; a contact device in said auxiliary circuit; a contact closer connected with the said scale lever and constructed to engage said contact device when the scale lever is in normal zero position whereby at that time to close said auxiliary circuit and hold the lamp switch open; said contact device being so positioned relative to said scale lever that said contact closer becomes separated from said contact device to open the auxiliary circuit immediately upon the scale lever moving from normal zero position.

3. The combination with a weighing scale, including a scale lever, of an electric illuminating lamp for the scale, and a circuit for said lamp; a switch for said lamp circuit normally spring drawn into position to close said circuit; an auxiliary circuit including a solenoid operating upon said lamp switch to hold the same open against its spring tension; two contact strips forming a make and break device for said auxiliary circuit; a contact closer carried upon the end of said scale lever and projecting between said contact strips to close the auxiliary circuit when the scale lever is in normal zero position, said contact strips being positioned to be engaged by said contact closer when the scale lever reaches normal zero position and also constructed of such extent as to remain in engagement with said contact closer during the travel of the contact closer beyond the range of its weighing positions.

4. The combination with a weighing scale, including a scale lever, of an electric illuminating lamp for the scale, and a circuit for said lamp; a switch for said lamp circuit normally spring drawn into position to close said circuit; an auxiliary circuit including a solenoid operating upon said lamp switch to hold the same open against its spring tension; two contact strips forming a make and break device for said auxiliary circuit; a contact closer carried upon the end of said scale lever and projecting between said contact strips to close the auxiliary circuit when the scale lever is in normal zero position, said contact strips being positioned to be engaged by said contact closer when the scale lever reaches normal zero position and also constructed of such extent as to remain in engagement with said contact closer during the travel of the contact closer beyond the range of its weighing positions, and means for adjusting said contact strips relative to said scale lever to effect the closing of the circuit therebetween when the scale lever is exactly in zero position.

5. The combination with a weighing scale, including a scale lever, of an electric illuminating lamp for the scale, and a circuit for said lamp; a switch for said lamp circuit normally spring drawn into position to close said circuit; an auxiliary circuit including a solenoid operating upon said lamp switch to hold the same open against its spring tension; two contact strips forming a make and break device for said auxiliary circuit; a contact closer carried upon the end of said scale lever and projecting between said contact strips to close the auxiliary circuit when the scale lever is in normal zero position, said contact strips being positioned to be engaged by said contact closer when the scale lever reaches normal zero position and also constructed of such extent as to remain in engagement with said contact closer during the travel of the contact closer beyond the range of its weighing positions; and means for adjusting the said contact strips relative to each other to effect greater or less bearing pressure upon the said contact closer sliding therebetween.

6. The combination with a weighing scale, including a movable scale element, of an electric illuminating lamp for the scale, and a circuit for said lamp; a contact device having connections for controlling the lamp illuminating circuit and comprising spaced contact strips; and a conducting pin carried by said movable scale element for engaging said contact strips and forming part of the circuit thereof to establish the current through the contact device.

7. The combination with a weighing scale, including a movable scale element, of an electric illuminating lamp for the scale, and a circuit for said lamp; a contact-controlling member carried by said movable scale element and insulated therefrom; and a contact device having a separate circuit with means included therein for controlling the lamp circuit and coöperating with said contact-controlling member, said device and said member being relatively constructed and located to produce uniform contact pressure therebetween over the complete range of contact movement.

8. The combination with a weighing scale, including a movable scale element, of an electric illuminating lamp for the scale, and a circuit for said lamp; a contact-controlling member carried by said movable scale element and insulated therefrom; and a contact device having a separate circuit with means included therein for controlling the lamp circuit and having a side thrust against said contact-controlling member over its range of contact making positions.

9. The combination with a weighing scale, including a movable scale element, of an electric illuminating lamp for the scale, and a circuit for said lamp; a contact-controlling member carried by said movable scale element; and a duplex contact device having connections for controlling the lamp circuit and exerting contact pressure on opposite sides of said contact-controlling member over its range of contact-making positions.

10. The combination with a weighing scale, including a movable scale element, of an electric illuminating lamp for the scale, and a circuit for said lamp; a contact-controlling member carried by said movable scale element; a duplex contact device having connections for controlling the lamp circuit and exerting contact pressure on opposite sides of said contact-controlling member over its range of contact-making positions; and means for adjusting said contact device to vary the lateral contact pressure on said contact-controlling member.

11. The combination with a weighing scale, including a movable scale element, of an electric illuminating lamp for the scale, and a circuit for said lamp; a contact controlling member carried by said movable scale element; a movable plate carrying a pair of confronting contact strips pressing laterally upon opposite sides of said contact controlling member, and said strips having connections for controlling said lamp circuit; means for moving said plate back and forth in the direction of said contact strips to vary the time of contacting of the said contact controlling member with said strips.

In testimony whereof I affix my signature in the presence of two subscribing witnesses.

CHARLES B. LONGSTRETH.

Witnesses:
E. R. LINES,
WELLMORE B. TURNER.